(12) United States Patent
Carnevali

(10) Patent No.: US 10,939,070 B1
(45) Date of Patent: Mar. 2, 2021

(54) SYSTEMS AND METHODS FOR GENERATING VIDEO IMAGES IN A CENTERED VIEW MODE

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 0 days.

(21) Appl. No.: 16/917,067

(22) Filed: Jun. 30, 2020

Related U.S. Application Data

(63) Continuation of application No. 16/912,011, filed on Jun. 25, 2020.

(51) Int. Cl.
| | | |
|---|---|---|
| *H04N 7/14* | (2006.01) | |
| *H04N 5/262* | (2006.01) | |
| *H04N 5/225* | (2006.01) | |
| *H04N 5/247* | (2006.01) | |
| *G06T 5/50* | (2006.01) | |
| *G06T 5/00* | (2006.01) | |
| *H04N 5/232* | (2006.01) | |

(Continued)

(52) U.S. Cl.
CPC .............. *H04N 7/14* (2013.01); *G06F 3/013* (2013.01); *G06K 9/00228* (2013.01); *G06T 3/60* (2013.01); *G06T 5/002* (2013.01); *G06T 5/50* (2013.01); *H04N 5/2253* (2013.01); *H04N 5/23212* (2013.01); *H04N 5/247* (2013.01); *H04N 5/2624* (2013.01); *G06T 2207/10016* (2013.01); *G06T 2207/20221* (2013.01)

(58) Field of Classification Search
CPC ........ H04N 7/142; H04N 7/144; H04N 7/147; H04N 7/15; H04N 5/77; H04N 5/23293; H04N 5/247; H04N 5/272; H04N 21/23424; H04N 21/44218; H04N 7/14; H04N 7/141; H04N 5/2624; H04N 5/23212; H04N 5/2253; G06F 3/013; G06F 3/04845; G06K 9/00335; G06K 9/00604; G06K 9/0061; G06K 9/00228; G06T 5/002; G06T 5/50; G06T 3/60; G06T 5/00; G06T 2207/10016; G06T 2207/20221; G06T 3/4038; G06T 5/009
See application file for complete search history.

(56) References Cited

U.S. PATENT DOCUMENTS

| | | | | |
|---|---|---|---|---|
| 2004/0174438 | A1* | 9/2004 | Jung | H04N 7/147 |
| | | | | 348/222.1 |
| 2007/0057866 | A1* | 3/2007 | Lee | H04N 7/147 |
| | | | | 345/1.1 |
| 2008/0298571 | A1* | 12/2008 | Kurtz | H04N 7/142 |
| | | | | 379/156 |

* cited by examiner

*Primary Examiner* — Yogeshkumar Patel
(74) *Attorney, Agent, or Firm* — Branch Partners PLLC; Bruce E. Black

(57) ABSTRACT

A system for generating video images of a user includes a display; a plurality of cameras arranged around the display; a memory that stores at least instructions; and one or more processors coupled to the display, cameras, and memory and configured to execute instructions that perform actions. The instructions include receiving, from the cameras, images of a user positioned in front of the cameras; when in a centered view mode, using the images from at least two of the cameras to generate video images of the user, wherein, in the video images, the eyes or face of the user are centered in the video images regardless of whether the eyes or face of the user are centered in the images from the at least two cameras; and transmitting the video images.

20 Claims, 6 Drawing Sheets

(51) Int. Cl.
*G06F 3/01* (2006.01)
*G06K 9/00* (2006.01)
*G06T 3/60* (2006.01)

SYSTEMS AND METHODS FOR GENERATING VIDEO IMAGES IN A CENTERED VIEW MODE

CROSS-REFERENCE TO RELATED APPLICATIONS

This patent application is a continuation of U.S. patent application Ser. No. 16/912,011, filed Jun. 25, 2020, which is incorporated herein by reference.

FIELD

The invention relates to systems and method for video communication. The invention relates to systems and method for using multiple cameras to generate video images with the eyes or face of the subject centered in the video images viewed by a viewer or the user appearing to be looking at the viewer.

BACKGROUND

Video conferencing is becoming more common. In many instances, a single individual is at a particular site and using a camera on a computer, monitor, phone, or tablet (or an add-on camera with one of these devices) which displays that individual's face during the video conference. It can be distracting to others viewing the video conference when the camera isn't aligned with the eyes of the individual. In these instances, when speaking with someone, the participants aren't ever looking directly into the camera, so it really isn't an eye-to-eye meeting.

BRIEF SUMMARY

One embodiment is a system for generating video images of a user. The system includes a display; a plurality of cameras arranged around the display; a memory that stores at least instructions; and one or more processors coupled to the display, cameras, and memory and configured to execute instructions that perform actions. The instructions include receiving, from the cameras, images of a user positioned in front of the cameras; when in a centered view mode, using the images from at least two of the cameras to generate video images of the user, wherein, in the video images, the eyes or face of the user are centered in the video images regardless of whether the eyes or face of the user are centered in the images from the at least two cameras; and transmitting the video images.

Another embodiment is a method for generating video images of a user. The method includes receiving, from a plurality of cameras, images of a user positioned in front of the cameras; when in a centered view mode, using the images from at least two of the cameras to generate video images of the user, wherein, in the video images, the eyes or face of the user are centered in the video images regardless of whether the eyes or face of the user are centered in the images from the at least two cameras; and transmitting the video images.

Yet another embodiment is a processor readable non-transitory storage media that includes instructions for generating video images of a user, where execution of the instructions by one or more processors performs actions. The actions include receiving, from a plurality of cameras, images of a user positioned in front of the cameras; when in a centered view mode, using the images from at least two of the cameras to generate video images of the user, wherein, in the video images, the eyes or face of the user are centered in the video images regardless of whether the eyes or face of the user are centered in the images from the at least two cameras; and transmitting the video images.

In at least some embodiments, when in the centered mode, the eyes of the user in the video images appear to be looking directly out of the second display regardless of whether the eyes of the user are centered on any one of the at least two cameras. In at least some embodiments, when in the centered mode, the video images appear to be from a single camera with the eyes of the user in the video images looking directly at the camera.

In at least some embodiments, using the images includes compositing the images from the at least two cameras to generate the video images. In at least some embodiments, using the images includes stitching together portions of the images from the at least two cameras to generate the video images. In at least some embodiments, using the images includes creating a model using the images from the at least two cameras and rotating or translating or both rotating and translating the model to generate the video images.

In at least some embodiments, using the images includes blurring or replacing a background behind the user to generate the video images. In at least some embodiments, the method or the actions further include, when the eyes of the user are outside a field of view of all of the cameras or a predefined number of the cameras, maintaining the latest of the video images as a current video image. In at least some embodiments, the method or the actions further include, when the eyes of the user return to the field of view of all of the cameras or the predefined number of the cameras, continuing to use the images from the at least two of the cameras to generate the video images of the user.

In at least some embodiments, the method or the actions further include, when the user is outside of a predefined focal range, automatically switching to a standard view mode in which the video images correspond to the images from one of the cameras. In at least some embodiments, the method or the actions further include, when the user returns to the predefined focal range, automatically switching back to the centered view mode. In at least some embodiments, the method or the actions further include using an eye tracking engine or a facial recognition engine to facilitate the generation of the video images.

In at least some embodiments, the method or the actions further include receiving a command from the user to track an object other than the user and using the images from the at least two cameras to generate video images focused on the object. In at least some embodiments, the method or the actions further include receiving a command from the user to track an object other than the user and switching to a standard view mode in which the video images correspond to the images from one of the cameras and are focused on the object. In at least some embodiments, the method or the actions presenting at least one control on the display for the user to activate to switch to the centered view mode or to switch to a standard view mode in which the video images correspond to the images from one of the cameras.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The invention relates to systems and method for video communication. The invention relates to systems and method for using multiple cameras to generate video images with the eyes or face of the subject centered in the video images viewed by a viewer or the user appearing to be looking at the viewer.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes one or more processors.

Figure 1:
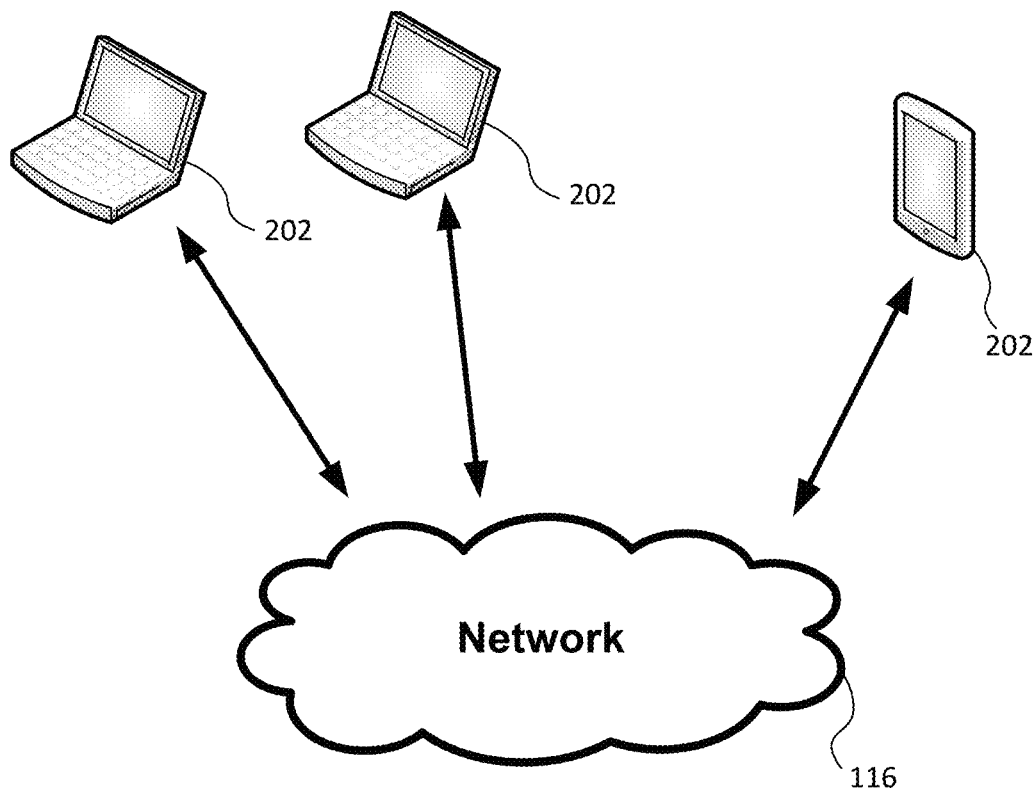
FIG. 1 is a schematic representation of a network environment.

The systems and methods described herein can be used for video communication which will often occur between individuals utilizing a network environment. FIG. 1 illustrates one embodiment of a network environment. It will be understood that the network environment includes a network 116 that can be a local area network, a wide area network, the Internet, or the like or any combination thereof. It will also be understood that the network can include devices, other than those illustrated, coupled to the network and that there may be multiple devices of each type illustrated connected to the network. The environment includes a network 116 to which is attached, either directly or through other devices, one or more computing devices 102 (e.g., laptop computers, desktop computers, workstations, terminals, servers, tablets, cell phones, personal data assistants, or the like). Methods of communication can include both wired and wireless (e.g., RF, optical, Wi-Fi, Bluetooth™, or infrared or the like) communications methods and such methods provide a type of computer readable media; namely communication media.

Figure 2:
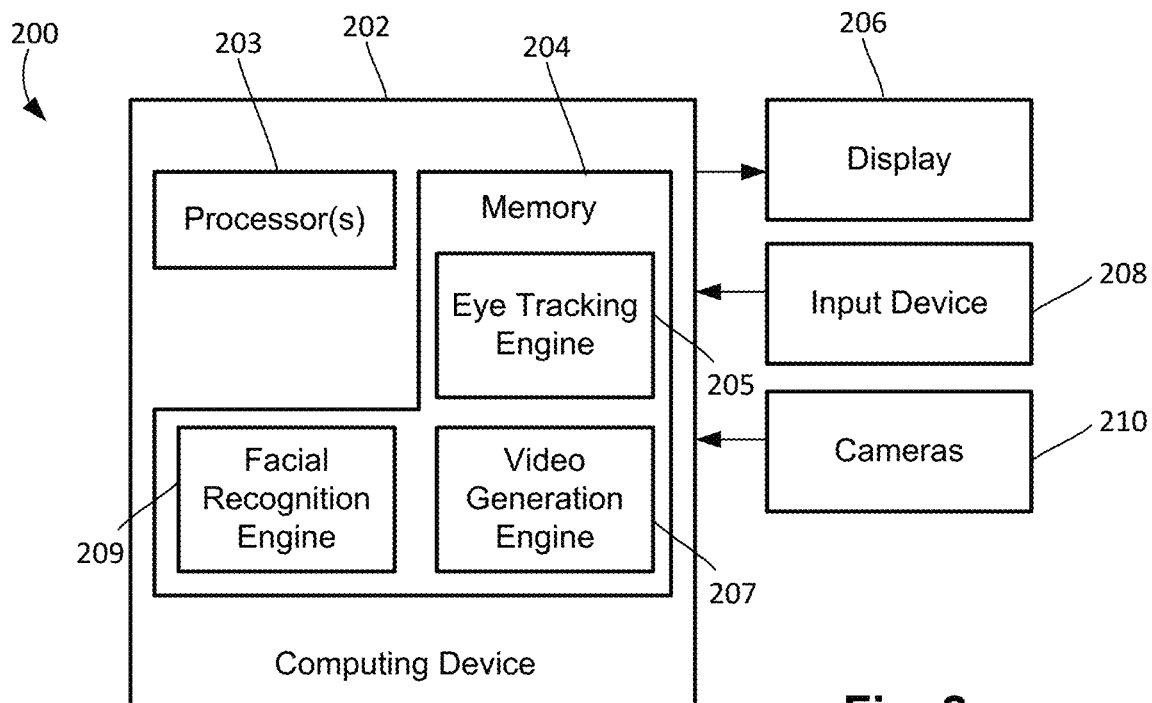
FIG. 2 is a schematic block diagram of one embodiment of a system including a computing device, according to the invention.

FIG. 2 illustrates one embodiment of a system 200 which can be used for video communications including generating video images of a user that can be viewed on the display of a viewer. The system 200 includes a computing device 202, a display 206, at least one user input device 208, and multiple cameras 210. In at least some embodiments, the computing device 202 includes one or more processors 203 and a memory 204 and is communicatively coupled to the display 206, the user input device(s) 208, and the multiple cameras 210.

The computing device 202 can be, for example, a laptop computer, desktop computer, tablet, mobile device, smartphone or any other device that can run applications or programs, or any other suitable device for processing information. The computing device 202 can be entirely local to the user or can include components that are non-local to the user including one or more of the processors 203 or memory 204 (or portions thereof). For example, in some embodiments, the user may operate a terminal that is connected to a non-local computer. In some embodiments, the memory (or a portion of the memory) can be non-local to the user.

The computing device 202 can utilize any suitable processor(s) 203 including one or more hardware processors that may be local to the user or non-local to the user or other components of the computing device. Each processor 203 is configured to execute instructions provided to the processor in order to perform actions.

Any suitable memory 204 can be used for the computing device 202. The memory 204 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, solid state drive (SSD), CD-ROM, digital versatile disks ("DVD"), or other optical storage, magnetic cassettes, magnetic tape, magnetic disk storage or other magnetic storage devices, or any other medium which can be used to store the desired information and which can be accessed by a computing device.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, Wi-Fi, Bluetooth®, and other wireless media.

The memory 204 includes instructions that can be executed in the processor(s) 203. The memory may also include instructions that constitute a variety of different software engines. For example, the memory 204 can include one or both of an eye tracking engine 205 (or, alternatively or additionally, a facial recognition engine 209) and a video generation engine 207. In at least some embodiments, any of these engines may be referred to as a module or logic.

The display 206 can be any suitable display device, such as a monitor, screen, display, or the like. The user input device(s) 208 can be, for example, a keyboard, mouse, touch screen, track ball, joystick, voice recognition system, or any combination thereof, or the like.

The cameras 210 can be built-in the computing device 202 or display 206 (such as a built-in webcam on a laptop computer or a monitor) or can be added to (or separate from) the computing device or display (such as a webcam attached to a laptop or monitor or a web cam that can stand alone) or can be any combination thereof (for example, the system can include one built-in webcam and three additional webcams that are added to the display or computing device). The system can have any number of cameras 210 including, but not limited to, two, three, four, five, six, eight, or more cameras.

The system 200, in operation, includes a centered view mode, described below, which modifies the images obtained by two or more of the cameras 210 of the system to generate video images for a viewer. In at least some embodiments, the video images, when the system is in the centered view mode, are generated so that the user's eyes appear to look directly at a viewer (or at a position where the viewer is likely to be positioned) of the video images. In at least some embodiments, the video images, when the system is in the centered view mode, are generated so that the user appears to be looking straight out of display that the viewer is looking at. In at least some embodiments, the video images, when the system is in the centered view mode, are generated so that the user's eyes or face centered on the display of the viewer. In at least some embodiments, the video images, when the system is in the centered view mode, are generated so that the video images appear to be from a camera (which could be a real camera or a virtual camera) with the user looking directly into that camera.

Figure 3A:
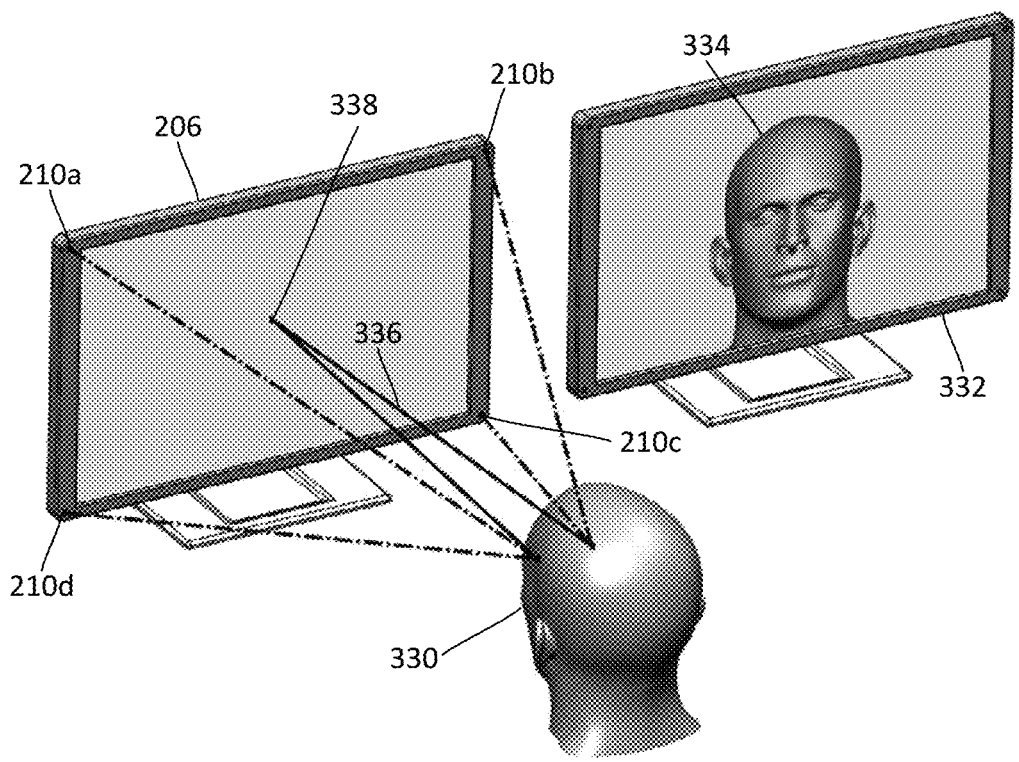
FIGS. 3A to 3C illustrate a portion of the system of FIG. 2, as well as a second display for receiving video images from the system, with the user's eyes focused at different positions on the display of the system, according to the invention.
Figure 3B:
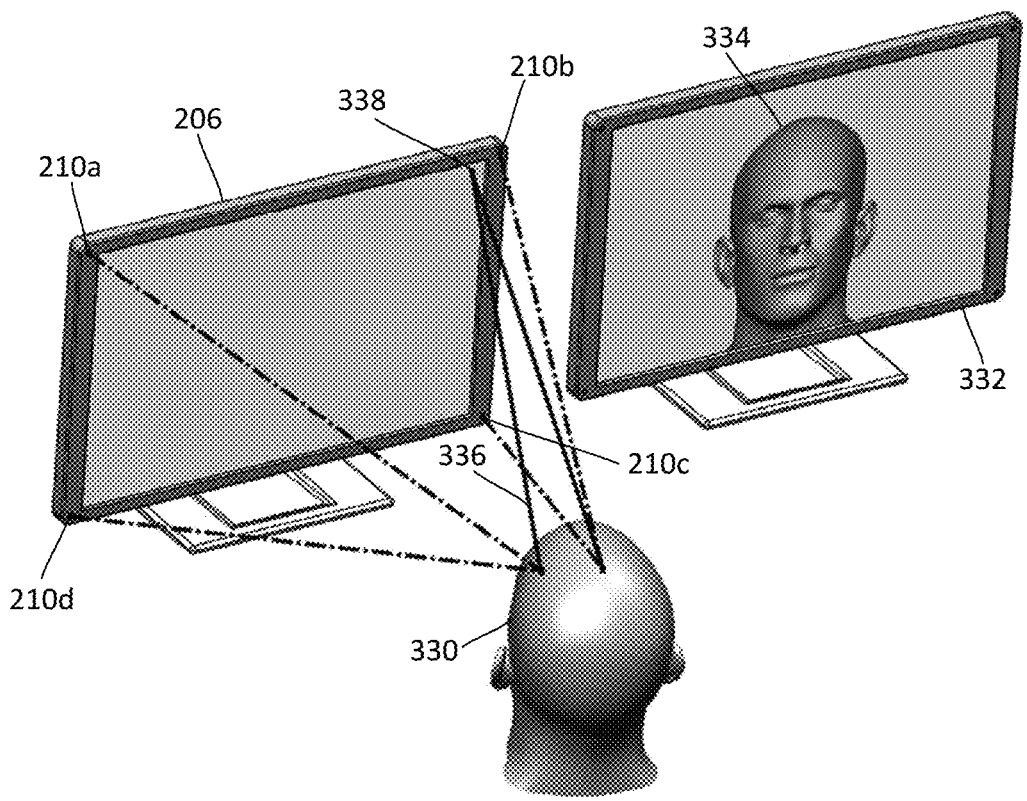
Figure 3C:
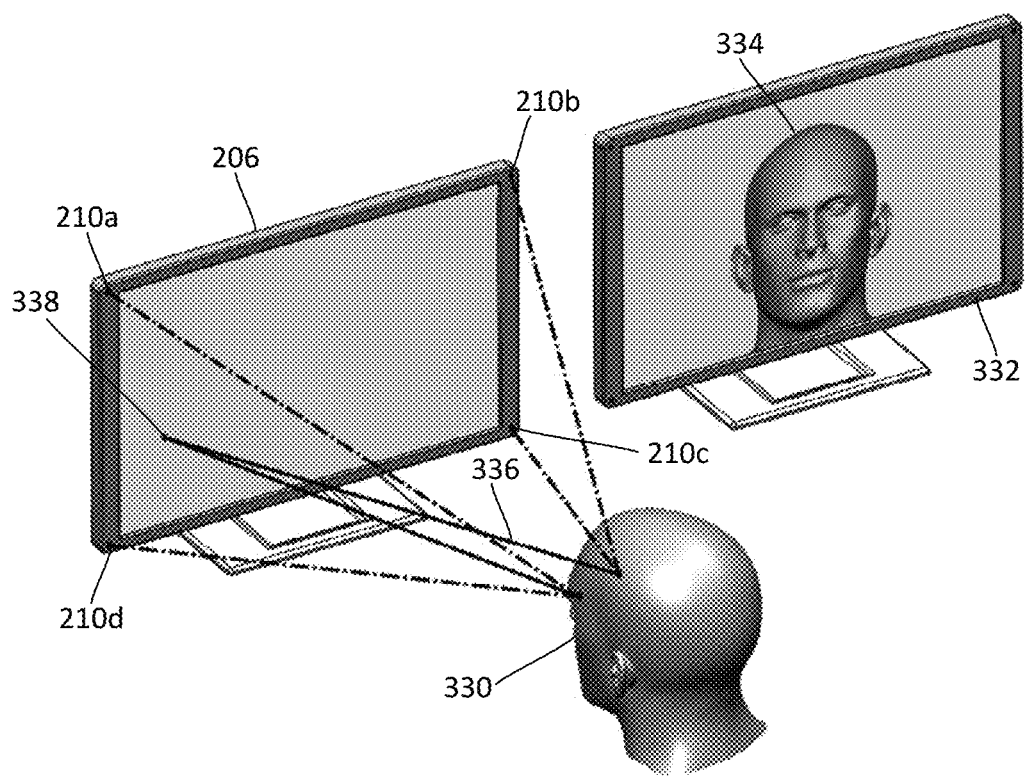

FIGS. 3A to 3C illustrate one embodiment of a display 206 of the system 200 (FIG. 2) with four cameras 210a, 210b, 210c, 210d for obtaining images of a user 330. In FIGS. 3A to 3C the solid lines 336 trace from the eyes of the user 330 to the point 338 on the display 206 where the eyes are looking. Each of the FIGS. 3A to 3C illustrate the user 330 looking at a different point 338 on the display 206. The cameras 210a, 210b, 210c, 210d collect images of the user 330 and the computing device 202 uses those one or more of those images to generate video images 334

FIGS. 3A to 3C also illustrate a second display 332 that is distant from the user 330. (FIGS. 3A to 3C illustrate the second display 332 near the display 206, but this is for illustration purposes only. Typically, but not necessarily, the second display 332 will be distant from the display 206 and the user 330.) For example, the second display 332 can be in communication with the system 200 over a network 116. The second display 332 receives and displays (to a viewer (not shown)) video images 334 generated by the system 200 using the images from the cameras 210a, 210b, 210c, 210d.

In at least some embodiments, the system 200 can have a standard view mode and a centered view mode. In at least some embodiments, a user 330 (or, optionally, a viewer of the second display 332) can select between these two modes. In at least some embodiments, the system 200 may also automatically switch between modes and, in some embodiments, the automatic switching may occur under certain circumstances such as those described below. In the standard view mode, the system 200 uses one of the cameras 210a, 210b, 210c, 210d to produce video images that are sent to the second display 334.

In the centered view mode, the cameras 210a, 210b, 210c, 210d collect images of the user 330 and the computing device 202 uses those images to generate video images 334. In at least some embodiments, the video images 334 appear to a viewer of the second display 332 as if the user is looking at the viewer (or at a position where the viewer is likely to be positioned while observing the second display 332) or looking straight out of the second display 332 regardless of where the user is actually looking on the display 206. In at least some embodiments, the video images 334 generated by the system 200, when viewed on the second display 332, present the user's eyes or user's face centered on the second display 332. In at least some embodiments, the video images 334 may present the user's eyes or user's face centered on the second display 332 and the video images appear to a viewer of the second display 332 as if the user is looking at the viewer (or at least at a position where the viewer is most likely to be positioned while observing the second display 332) or looking straight out of the second display 332. In at least some embodiments, the video images 334 generated by system 200, when viewed on the second display 332, appear to be from a camera (which could be a real camera or a virtual camera) with the user looking directly into that camera.

Figure 3D:
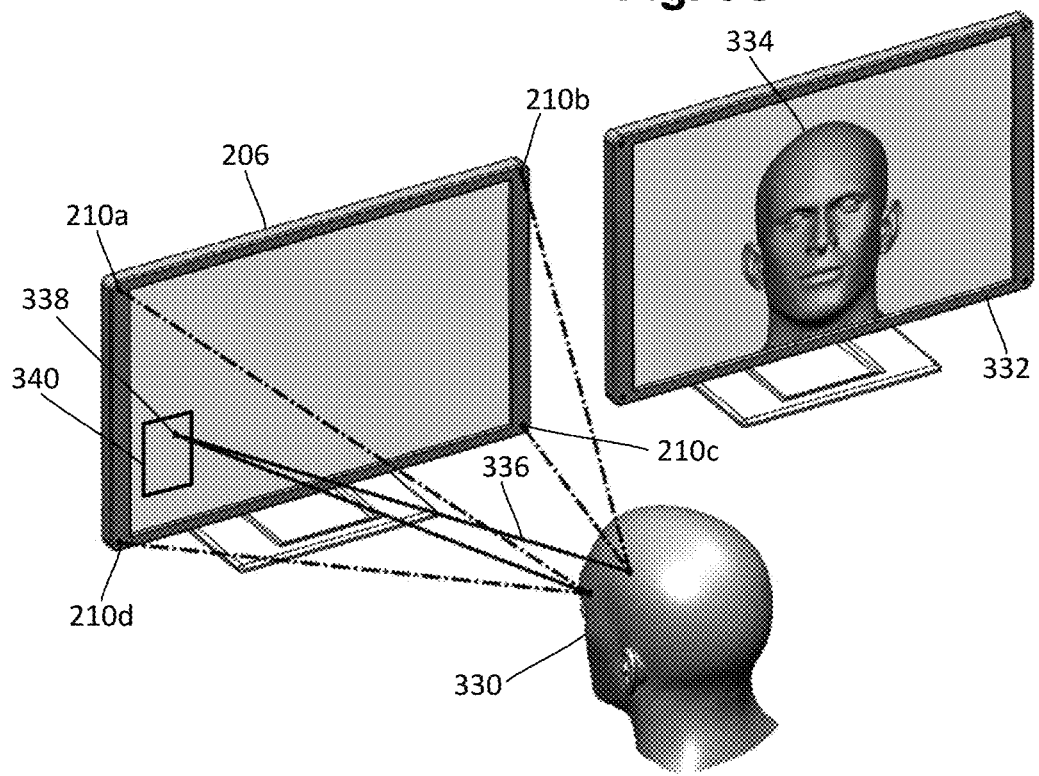
FIG. 3D illustrates a portion of the system of FIG. 2, as well as a second display for receiving video images from the system, with the user's eyes focused on a video image of an individual associated with the second display, displayed by the system, to the appearance of "eye contact" between the user of the system and viewer of the video images generated by the system, according to the invention.

In at least some embodiments, the system 200 can receive an image or video image 340 from the viewer which the system 200 displays on the display 206, as illustrated in FIG. 3D. The user 330 can focus his eyes on the video image 340 of the viewer, as illustrated in FIG. 3D, so that the user and the viewer appear to have "eye contact" during the conversation.

Figure 4:
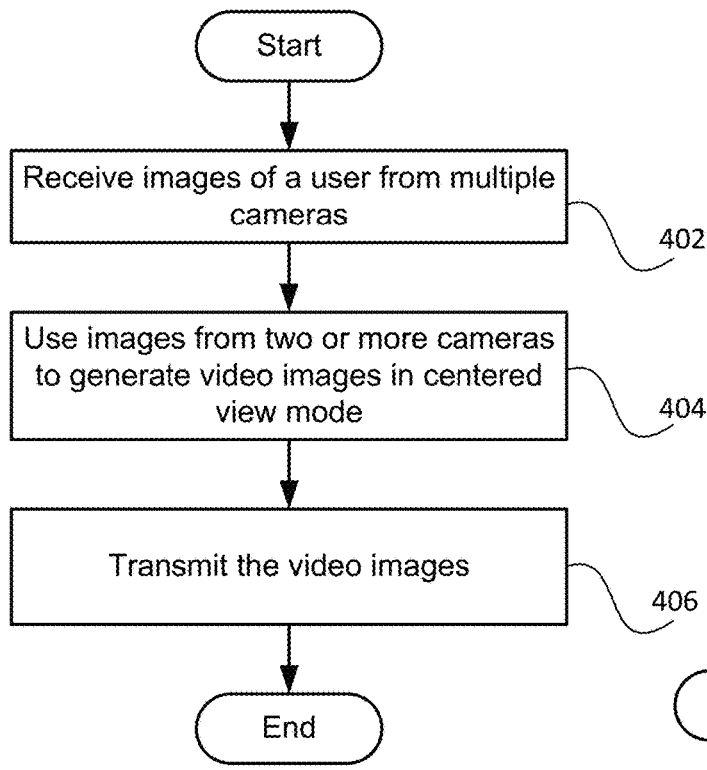
FIG. 4 is flowchart of one embodiment of a method of generating video images, according to the invention.

FIG. 4 illustrates one method of generating video images of a user. In step 402, images of the user 330 are received from multiple cameras 210a, 210b, 210c, 210d. In step 404, when in the centered view mode, the images from at least two of the cameras are used to generate video images 334 of the user 330. In at least some embodiments, in the video images 334, the eyes or face of the user 330 are centered in the video images regardless of whether the eyes or face of the user are centered in the images from the at least two cameras. In at least some embodiments, in the video images 334, when viewed on the second display 332, the user's eyes or user's face are centered on the second display 332. In at least some embodiments, in the video images 334, it appears to a viewer of the second display 332 as if the user is looking at the viewer (or at least at a position where the viewer is most likely to be positioned while observing the second display 332) or looking straight out of the second display 332. In at least some embodiments, in the video images 334, when viewed on the second display 332, the video images appear to be from a camera (which could be a real camera or a virtual camera) with the user looking directly into that camera. In step 406, the video images 334 are transmitted. For example, the video images 334 are transmitted through a network 116 for viewing on the second display 332 by a viewer.

In at least some embodiments, the computing device 102 can utilize eye tracking software, facial recognition software, or any combination thereof to determine, from the images obtained by cameras 210a, 210b, 210c, 210d, where the eyes or face (or both) of the user 330 are located. The computing device 102 may use, for example, an eye tracking engine 205 using instructions stored in the memory 204, as illustrated in FIG. 2, or, alternatively or additionally, a facial recognition engine 209 using instructions stored in the memory.

In at least some embodiments, the images from two or more of the cameras 210a, 210b, 210c, 210d are composited to generate the video images 334 using, for example, a video generation engine 207. In at least some embodiments, the images from one or more of the cameras 210a, 210b, 210c, 210d are stitched together to create a composite image to generate the video images 334. In at least some embodiments, the composite image can be rotated, translated, manipulated, or any combination thereof to generate the video images 334. In at least some embodiments, the images from one or more of the cameras 210a, 210b, 210c, 210d can be used to form a model of the user's head, face, or more that can be rotated, translated, manipulated, or any combination thereof to generate the video images 334.

In at least some embodiments, the video images 334 are generated so that the mouth of the user 330 appears to move realistically in the video images 334 as the user 330 speaks or changes mouth position or expression. In at least some embodiments, the video images 334 are generated so that the hands or body gestures of the user 330 appear to move realistically in the video images 334.

In at least some embodiments, in the centered view mode, as the user's body moves, for example, from side to side or up or down, the generated video images 334 appear to track the user's body and keep the user's head or eyes centered (or maintain the appearance of the user looking at the viewer or looking straight out of the second display 332 or looking at a real or virtual camera) as if a single camera were panning or tilting.

In at least some embodiments, in the centered view mode, the background behind the user 330 can be blurred in the video images 334 (for example, in a manner similar to an f-stop depth of field setting on a camera). The blurring may reduce or hide artifacts or distractions created in the generation of the video images 334. In at least some embodiments, in the centered view mode, the background can be replaced by a selected or selectable background photo, picture, or the like in the video images 334. Background replacement methods and software are known and can be used. In at least some embodiments, a user interface may provide a control for a user to select background blurring or the user interface may provide a control for a user to select background replacement. In at least some embodiments, the system 200 may automatically impose background blurring or background replacement (which, in at least some embodiments, the user may deselect or select another background option.)

Figure 5:
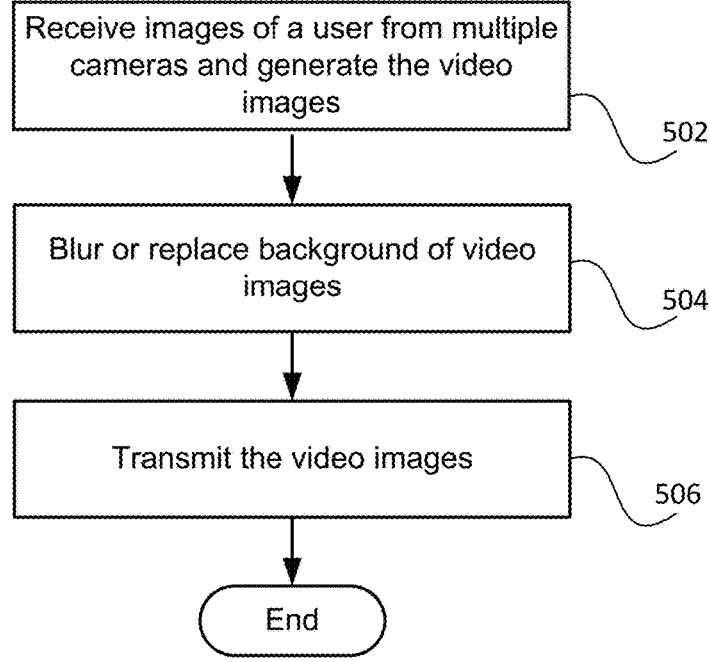
FIG. 5 is flowchart of another embodiment of a method of generating video images, according to the invention.

FIG. 5 illustrates one embodiment of a method of generating video images. In step 502, images of the user are received from multiple cameras and video images are generated using, for example, the method illustrated in FIG. 4. In step 504, the background of the video images is blurred or replaced as described above. In step 506, the video images are transmitted.

In at least some embodiments, in the centered view mode, when the user's head moves so that the user's eyes are outside of the field of view of the cameras 210a, 210b, 210c, 210d (or a predefined number or subset of the cameras), the last video image 334 is presented to the viewer until the user's eyes return to the field of view. In at least some embodiments, the system 200 may have a predetermined period of time (for example, 1, 2, 5, 10, or 15 seconds or more), which is optionally user-selectable, after which if the user's eyes have not returned to the field of view, the system 200 will return to the standard view mode. Optionally, the system 200 may automatically return to the centered view mode when the user's eyes return to the field of view and are recaptured by the cameras 210a, 210b, 210c, 210d (or by a predefined number or subset of the cameras).

Figure 6:
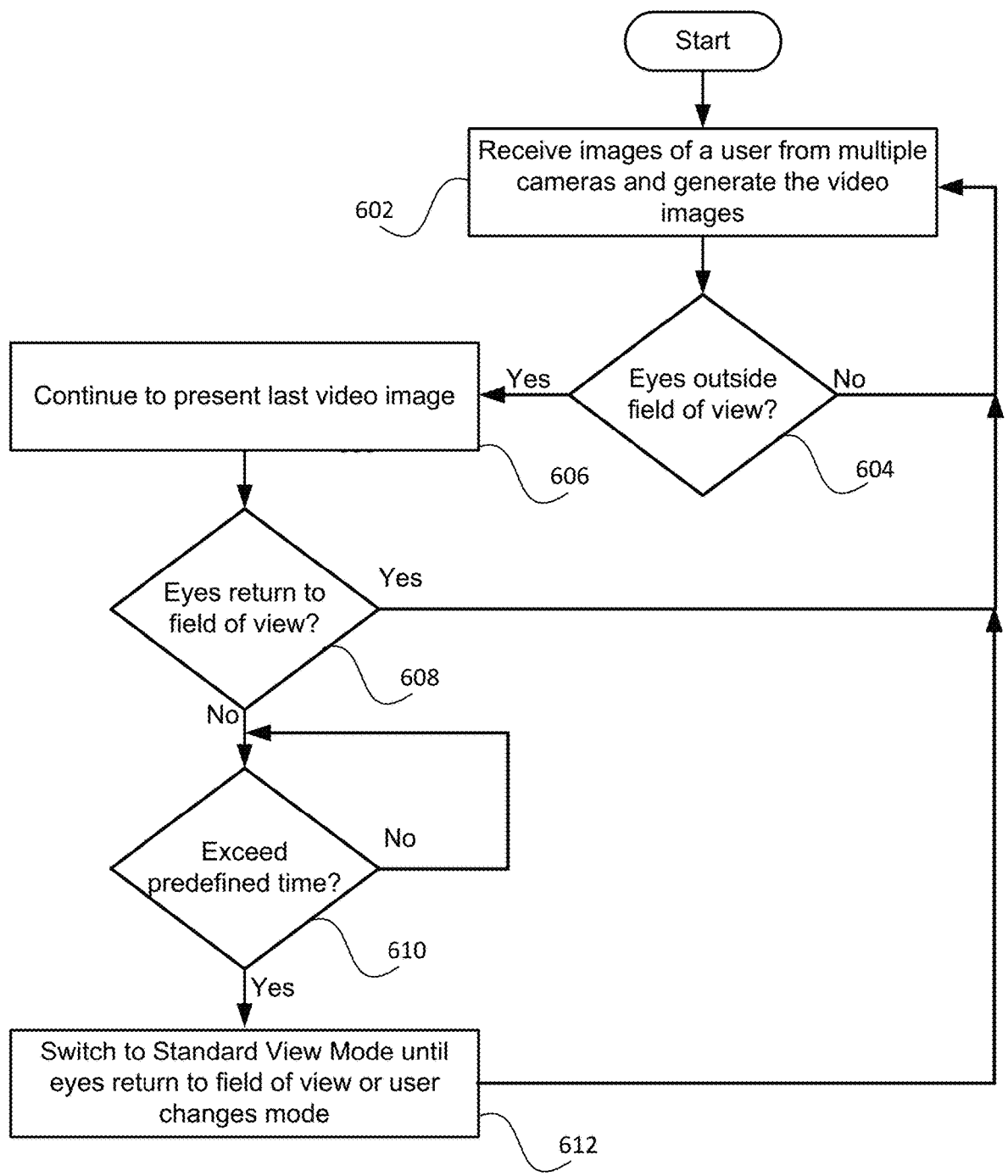
FIG. 6 is flowchart of one embodiment of a method of generating video images when the user's eyes are outside the field of view of the cameras, according to the invention.

FIG. 6 illustrates one embodiment of a method of generating video images when the user's eyes are outside the field of view of the cameras. In step 602, images of the user are received from multiple cameras and video images are generated using, for example, the method illustrated in FIG. 4. In step 604, a query is made whether the user's eyes are outside the field of view of all the cameras (or a predefined number or subset of the cameras.) If not, the process returns to step 602. If yes, in step 606 the last video image continues to be presented. In step 608, a query is made whether the user's eyes have returned to the field of view. If yes, the process returns to step 602. In not, in step 610 a query is made whether the time that the user's eyes have been outside the field of view has exceeded a predefined time. In not, step 610 is repeated. If yes, the system switches to standard view mode until the eyes return to the field of view or the user changes modes. This process may return to step 602. In at least some embodiments, fewer or more steps may be included in other embodiments of this method.

In at least some embodiments, in the centered view mode, if the user 330 leaves a predefined focal range, then the system 200 returns to the standard view mode where the image is provided using one of the cameras 210a, 210b, 210c, 210d. In at least some embodiments, the system 200 automatically returns to the centered view mode when the user 330 returns to the predefined focal range. As an example, the focal range may be selected so that if the user 330 moves 3 feet (about 0.9 meters) or more from the focal points of the cameras 210a, 210b, 210c, 210d then the system 200 return to a standard view mode. In at least some embodiments, the user 330 may select (or the system 200 may be set at or select) a focal range for the centered view mode. In at least some embodiments, the system 200 may automatically select a focal range favors processing speed of the video images 334 over accuracy of the video images 334. In at least some embodiments, the system 334 may provide a user interface with a control (such as a slider, dial, input box, or the like or any other suitable control) that allows the user 330 to select the focal range for the centered view mode. In at least some embodiments, the system 200 indicate to the user whether a focal range favors processing speed of the video images 334 or accuracy of the video images 334.

Figure 7:
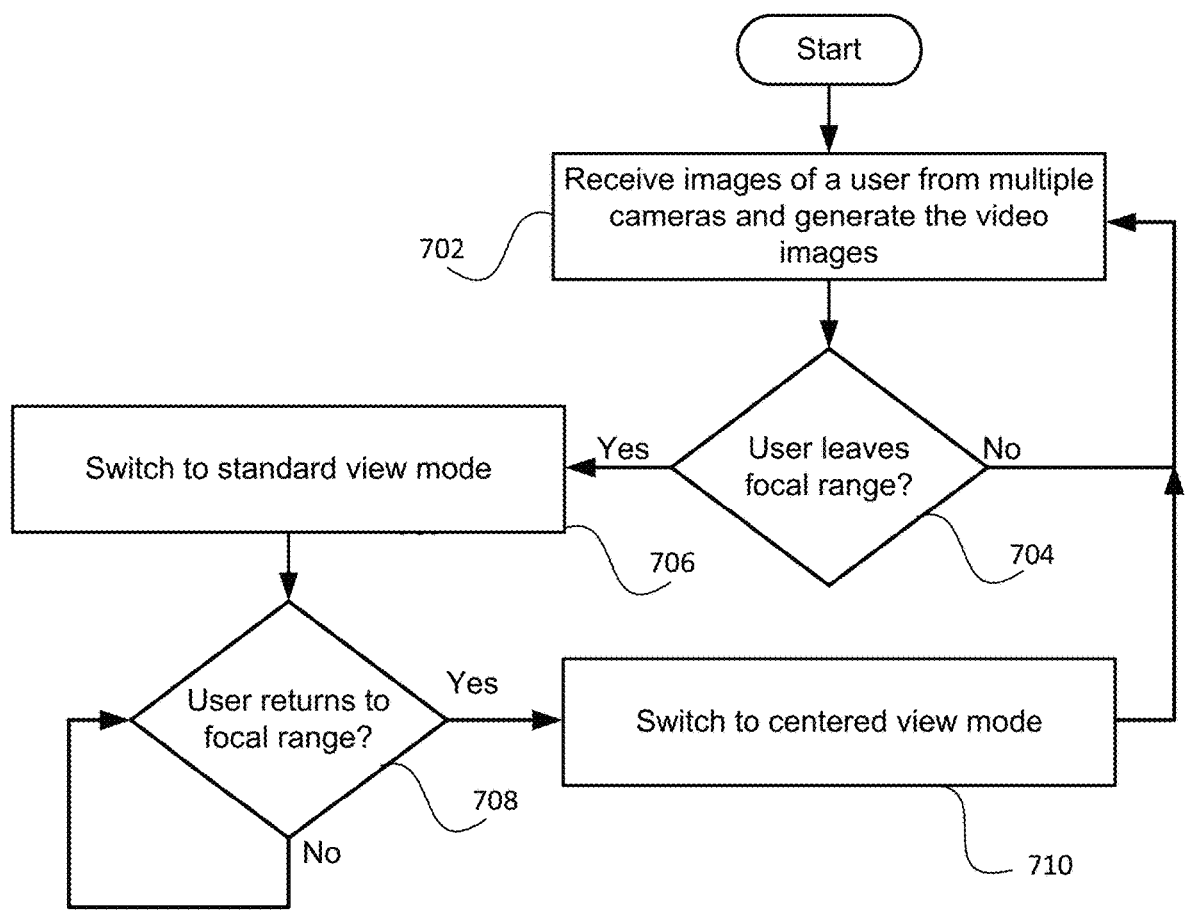
FIG. 7 is flowchart of one embodiment of a method of generating video images when the user leaves a predefined focal range, according to the invention.

FIG. 7 illustrates one embodiment of a method of generating video images when the user leaves a predefined focal range. In step 702, images of the user are received from multiple cameras and video images are generated using, for example, the method illustrated in FIG. 4. In step 704, a query is made whether the user has left the predefined focal range. If not, the process returns to step 702. If yes, in step 706 the system switches to the standard view mode. In step 708, a query is made whether the user has returned to the predefined focal range. If not, the process returns to step 708. In yes, in step 610 the system returns to the centered view mode and then returns to step 702. In at least some embodiments, fewer or more steps may be included in other embodiments of this method.

In at least some embodiments, the system 220 may include a user interface that includes a user-activatable control (such as a button or any other suitable control) that allows the user to turn the centered view mode on or off or that switches between the standard view mode and the centered view mode.

In at least some embodiments, in the centered view mode, the system 200 can track (or focus on) an object, such as a document, indicated by the user 330 (by, for example, the user selecting the object on the display 206) instead of the user's face or eyes. In at least some embodiments, in the centered view mode, upon user selection of the object, the system 200 can enter the standard view mode to track or focus on the object until the user deselects the object (or directs the system 200 to enter the centered view mode.)

It will be understood that each block of the flowchart illustration, and combinations of blocks in the flowchart illustration and methods disclosed herein, can be implemented by computer program instructions. These program instructions may be provided to one or more processors to produce a machine, such that the instructions, which execute on the processor(s), create means for implementing the actions specified in the flowchart block or blocks disclosed herein. The computer program instructions may be executed by one or more processors to cause a series of operational steps to be performed by the processor(s) to produce a computer implemented process. The computer program instructions may also cause at least some of the operational steps to be performed in parallel. Moreover, some of the steps may also be performed across more than one processor, such as might arise in a multi-processor computing device. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

The above specification and examples provide a description of the invention. Since many embodiments of the invention can be made without departing from the spirit and scope of the invention, the invention also resides in the claims hereinafter appended.

What is claimed as new and desired to be protected by Letters Patent of the United States is:

1. A system for generating video images of a user, the system comprising
   a display;
   a plurality of cameras arranged around the display;
   a memory that stores at least instructions; and
   one or more processors coupled to the display, cameras, and memory and configured to execute instructions that perform actions, comprising
      receiving, from the cameras, images of a user positioned in front of the cameras;
      when in a centered view mode, using the images from at least two of the cameras to generate video images of the user, wherein, in the video images, the eyes or face of the user are centered in the video images regardless of whether the eyes or face of the user are centered in the images from the at least two cameras, wherein, when in the centered mode, the video images appear to be from a single camera with the eyes of the user in the video images looking directly at the single camera regardless of whether the eyes of the user are looking directly at any one of the at least two cameras; and
      transmitting the video images for receiving by a video image display system of a viewer.

2. The system of claim 1, wherein the system is configured to generate the video images so that, when in the centered mode and the transmitted video images are received by the video image display system of the viewer, the eyes of the user in the video images appear to be looking directly out of a display of the video image display system of the viewer regardless of whether the eyes of the user are centered on any one of the at least two cameras.

3. The system of claim 1, wherein using the images comprises compositing the images from the at least two cameras to generate the video images.

4. The system of claim 1, wherein using the images comprises stitching together portions of the images from the at least two cameras to generate the video images.

5. The system of claim 1, wherein using the images comprises creating a model using the images from the at least two cameras and rotating or translating or both rotating and translating the model to generate the video images.

6. The system of claim 1, wherein using the images comprises blurring or replacing a background behind the user to generate the video images.

7. The system of claim 1, wherein the actions further comprise, when the eyes of the user are outside a field of view of all of the cameras or a predefined number of the cameras, maintaining a latest of the video images as a current video image.

8. The system of claim 7, wherein the actions further comprise, when the eyes of the user return to the field of view of all of the cameras or the predefined number of the cameras, continuing to use the images from the at least two of the cameras to generate the video images of the user.

9. The system of claim 1, wherein the actions further comprise, when the user is outside of a predefined focal range, automatically switching to a standard view mode in which the video images correspond to the images from one of the cameras.

10. The system of claim 9, wherein the actions further comprise, when the user returns to the predefined focal range, automatically switching back to the centered view mode.

11. The system of claim 1, wherein the actions further comprise using an eye tracking engine or a facial recognition engine to facilitate the generation of the video images.

12. The system of claim 1, wherein the actions further comprise receiving a command from the user to track an object other than the user and using the images from the at least two cameras to generate video images focused on the object.

13. The system of claim 1, wherein the actions further comprise receiving a command from the user to track an object other than the user and switching to a standard view mode in which the video images correspond to the images from one of the cameras and are focused on the object.

14. The system of claim 1, wherein the actions further comprise presenting at least one control on the display for the user to activate to switch to the centered view mode or to switch to a standard view mode in which the video images correspond to the images from one of the cameras.

15. A method for generating video images of a user, the method comprising
   receiving, from a plurality of cameras, images of a user positioned in front of the cameras;

when in a centered view mode, using the images from at least two of the cameras to generate video images of the user, wherein, in the video images, the eyes or face of the user are centered in the video images regardless of whether the eyes or face of the user are centered in the images from the at least two cameras, wherein, when in the centered mode, the video images appear to be from a single camera with the eyes of the user in the video images looking directly at the single camera regardless of whether the eyes of the user are looking directly at any one of the at least two cameras; and transmitting the video images for receiving by a video image display system of a viewer.

16. The method of claim 15, wherein using the images comprises blurring or replacing a background behind the user to generate the video images.

17. The method of claim 15, further comprising, when the eyes of the user are outside a field of view of all of the cameras or a predefined number of the cameras, maintaining a latest of the video images as a current video image.

18. The method of claim 15, further comprising, when the user is outside of a predefined focal range, automatically switching to a standard view mode in which the video images correspond to the images from one of the cameras.

19. A processor readable non-transitory storage media that includes instructions for generating video images of a user, wherein execution of the instructions by one or more processors performs actions, comprising:

receiving, from a plurality of cameras, images of a user positioned in front of the cameras;

when in a centered view mode, using the images from at least two of the cameras to generate video images of the user, wherein, in the video images, the eyes or face of the user are centered in the video images regardless of whether the eyes or face of the user are centered in the images from the at least two cameras, wherein, when in the centered mode, the video images appear to be from a single camera with the eyes of the user in the video images looking directly at the single camera regardless of whether the eyes of the user are looking directly at any one of the at least two cameras; and transmitting the video images for receiving by a video image display system of a viewer.

20. The processor readable non-transitory storage media of claim 19, wherein the actions further comprise, when the user is outside of a predefined focal range, automatically switching to a standard view mode in which the video images correspond to the images from one of the cameras.

* * * * *